United States Patent [19]

Rockett et al.

[11] Patent Number: 4,724,173
[45] Date of Patent: Feb. 9, 1988

[54] METHOD OF PREVENTING GEL COAT BLISTERING IN FIBER GLASS REINFORCED POLYMERS

[75] Inventors: Thomas J. Rockett, East Greenwich; Vincent C. Rose, Kingston, both of R.I.; Rachel Marino, Wellesley, Mass.

[73] Assignees: The Board of Governors for Higher Education, State of Rhode Island; Providence Plantations, both of Providence, R.I.

[21] Appl. No.: 823,603

[22] Filed: Jan. 29, 1986

[51] Int. Cl.⁴ .............................................. B05D 3/02
[52] U.S. Cl. .................................. 427/389.8; 427/322; 427/386; 427/387; 427/393.6
[58] Field of Search ............... 427/389.7, 389.8, 385.5, 427/393.6, 389, 407.3, 387, 386, 299, 322

[56] References Cited

U.S. PATENT DOCUMENTS

| | | | |
|---|---|---|---|
| 3,945,875 | 3/1976 | Jackson | 427/407.3 X |
| 4,331,735 | 5/1982 | Shanoski | 427/407.3 X |
| 4,372,800 | 2/1983 | Oizumi et al. | 427/407.3 X |
| 4,487,797 | 12/1984 | Watson | 427/407.3 X |
| 4,496,621 | 1/1985 | Hubert et al. | 427/407.3 X |
| 4,528,243 | 7/1985 | Kookootsedes et al. | 427/407.3 X |

*Primary Examiner*—Thurman K. Page
*Attorney, Agent, or Firm*—Samuels, Gauthier, Stevens & Kehoe

[57] ABSTRACT

A polyester coating applied to gel coated fiber reinforced plastic. The polyester coating prevents blistering of the gel coat.

13 Claims, 1 Drawing Figure

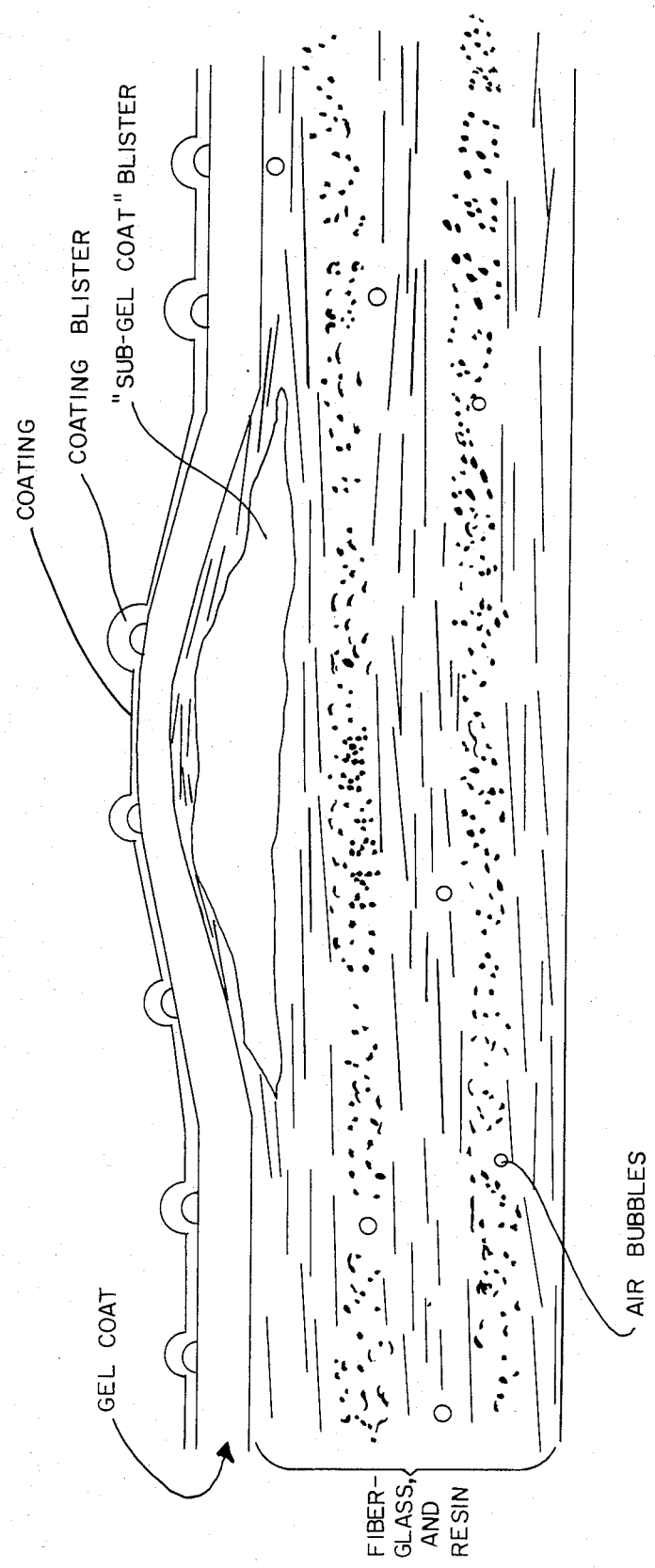

METHOD OF PREVENTING GEL COAT BLISTERING IN FIBER GLASS REINFORCED POLYMERS

BACKGROUND AND BRIEF SUMMARY OF THE INVENTION

Gel coated fiber reinforced plastics are subject to blistering if immersed in water for a prolonged time. Hulls of boats and walls of hot tubs are especially prone to blistering.

The blister problem costs boat owners enormous amounts of money each year. Further, the problem costs boat builders both money and loss of prestige.

The blistering of gel coated, glass reinforced plastic (GRP) structures such as boat hulls, swimming pools, bathroom components, etc. is a defect randomly affecting a portion of these products and is of major concern to manufactures and owners. This issue has been explored in discussions at ABBRA Meeting in Newport, R.I., Feb. 29, 1984; and in the following publications: Fraser-Harris, A. B. F. and Kyle, J. H., "FRP Bottom Blistering," Paper presented at the Chesapeake Sailing Yacht Symposium, Annapolis, Md. Jan. 15, 1983; Tuttle, B. L., "Safety Council Start Study of Boat Pox," Soundings, June, 1984; Norwood, L. S., Edgell, D. W. and Hankin, A. G., "Blister Performance of GRP Systems in Aqueous Environments," 36th Annual Conference SPI Reinforced Plastics/Composites Institute, Paper 23-F, (1981); Olford, S. C., "Osmosis: Causes and Effects," Yacht Brokers Designers and Surveyors Association Report (1978); Brueggeman, W. H., "Blistering of Gel Coat Laminates," 34th Annual Conference, SPI Reinforced Plastics/Composite Institute, Paper 4-E, (1979); and Anon, "Boatpox:Scratching the Surface of a Perplexing Problem," Practical Sailor, 10(15), (1984). Blisters appear as a raised, localized swelling of the gel coated laminate and occur after immersion. When blisters are ruptured a viscous acidic liquid is expelled.

It has been established that the diffusion of water into the composite and the presence of water-soluble constitutents within the laminate play important roles in blistering [Abeysinghe, H. P., Ghotra, J. S. and Pritchard, G., "Substances Contributing to the Generation of Osmotic Pressure in Resins and Laminates," Composites, 57 (1983), and Abeysinghe, H. P., Ghotra, J. S. Mahli, T. R. and Pritchard, G., "Blister Formation in RP: the Origin of the Osmotic Process," 38th Annual Conference, SPI Reinforced Plastics Composites Institute, Paper 17-B, (1983)].

The osmotic process plays an important role in blistering of the gel coat ["Substances Contributing to the Generation of Osmotic Pressure in Resins and Laminates," supra; "Blister Formation in RP: the Origin of the Osmotic Process," supra; and Ashbee, K. H. G., Frank, F. C. and Wyatt, R. C. "Water Damage in Polyester Resins," Proc. Roy. Soc., A300, (1967). In most polymers, water permeates into the laminate under a pressure or concentration gradient by a diffusion process which may be enhanced by surface cracks or pinholes in the gel coat. "Water Damage in Polyester Resins," supra, and Ashbee, K. H. G., Frank, F. C. and Wyatt, R. C. "Water Damage in Glass/Fibre Resin Composites," Proc. Roy. Soc. A312, (1969)]. Regester measured water permeation rates for various types of resins, [Regester, R. F., "Behavior of Fiber Reinforced Plastic Materials in Chemical Service," Corrosion, 25(4), (1969)]. Permeation rates have been shown to decrease as coating thickness increases [Hwang, S, and Kammenmeyer, K., "Effect of Thickness on Permeability," in *Permeability of Plastic Films and Coatings to Gases, Vapors, and Liquids,* Hoffenberg, H. B. (ed.), Polymer Science and Technology, Vol. 6, Plenum, N.Y. (1974)). Several studies also indicate certain polyester and epoxide resins show higher resistance to water permeation than general purpose orthophthalic resins ["Substances Contributing to the Generation of Osmotic Pressure in Resins and Laminates" supra; "Water Damage in Polyester Resin," supra; Abeysinghe, H. P., Edwards, W., Pritchard, G., and Swampillar, G. J. "Degradation of Crosslinked Resins in Water and Electrolyte Solutions," Polymer 23, (1982); and "Behavior of Fiber Reinforced Plastic Materials in Chemical Service", supra)]. Disk cracking has been shown to enhance permeation and epoxides show greater resistance to disk cracking than do some polyesters [Ghotra, J. S. and Pritchard, G., "Substances Contributing to the Generation of Osmotic Pressure in Resins and Laminates", supra] Specifically formulated polyurethane resins also have excellent resistance to water, [Paul, Swaraj, "Polyurethanes," in *Surface Coatings—Science and Technology,* Wiley, Chichester (1985)].

The susceptibility of the polymer to hydrolysis is also influenced by other components of the laminate. The laminate can contain easily hydrolyzable constituents or water-soluble residual substances, such as glass mat binder, pigment carriers, mold release agents, stabilizers, promoter components, catalyst components and uncrosslinked resin components. Studies have shown the rate and onset of blistering is determined by variations in laminate composition and fabrication procedures. ["Blister Performance of GRP Systems in Aqueous Environments", supra, "Blister Formation in RP: the Origin of the Osmotic Process," supra., "Variables Influencing the Blister Resistance of Marine Laminates", 37th Annual Conference, SPI Reinforced Plastics/ Composites Institute, Paper 21-B (1982) and Edwards, H. R., "Variables Influencing the Blister Performance of a Gel Coated Laminate," 34th Annual Conference SPI Reinforced Plastics/Composites Institute, Paper 4-D (1979)].

In order to prevent or reduce the incidence of blistering, it has been suggested that a barrier or protective coating be used over the polyester gel coat, [Ghotra, J. S. and Pritchard, G., "Osmotic Blister Formation and Prevention in FRP Marine Laminates," 28th National SAMPE Symposium (1983)]. The effectiveness of a barrier coating is determined by several factors. These include the coating composition, surface preparation, number of coats, application sequence of coating types, and compatibility of a multi-coat system which may include a primer.

The prior art technique has been to develop new gel coat formulations with improved hydrolytic stability. For example, an isophthalic acid-based resin has improved hydrolytic stability and thus is considered tto be less permeable than a general purpose orthophthalic acid-based resin. Formulations also include using neopentyl glycol (NPG) to replace the propylene glycol and other glycols in the polyester resin manufacturing processes. Due to the symmetry of NPG, it confers chemical stability by way of steric hindrance of the susceptible ester linkages to hydrolysis.

It is believed the blisters are caused by the formation of a solution inside the hull which grows by osmosis and as it expands, it pushes the overlying gel coat layer into a dome-shaped blister. Sizes can range from ½" to 4". The solution inside the blister forms by water diffusing slowly through the hull and being drawn into the osmotic center. The solution which forms in the blister is acidic, as well as under pressure, and can destroy the resin matrix by attacking the ester linkages. We placed three types of coatings over gel coated composites. The coating materials which are known to have a much lower water diffusivity than the general purpose orthophthalic acid-based polyester resin showed blistering and the more water diffusive polyester coating showed no blistering.

It appears this happens because an osmotic center is created as a result of low molecular weight hydrophilic molecules (which are always present in the material) concentrated at a spot. If the hull material is previous these low molecular weight species can be leached out of the fiber glass composite. When these constituents are absent, the osmotic process cannot occur and no osmotic pressure can build, therefore, no blisters will form.

Our invention is broadly directed to a composition and method wherein a gel coat is laminated to a fiber reinforced polymer and blistering of the gel coat is prevented when the fiber reinforced polymer is continually immersed in water. In a preferred embodiment a gel coated fiber reinforced polymer has a coating applied to the gel coat which prevents blistering.

Two coating materials were chosen to study the effect of a barrier coating on reducing water permeation into the gel coat polyester laminate. The coatings chosen were an epoxide and polyurethane. An orthophthalic acid-based resin was used as the criterion for evaluating blister formation. The epxoide and polyurethane resins are known for their chemical resistance, lower water diffusivity and hydrolytic stability.

It was discovered that the polyester resin, which is more permeable than the epoxide and polyurethane resins, prevented blistering.

BRIEF DESCRIPTION OF THE DRAWINGS

The FIGURE is a pictorial representation of a typical blisters in a gel coated fiber reinforced polymer.

DESCRIPTION OF THE PREFERRED EMBODIMENT(S)

A study performed at the University of Rhode Island investigated the effect of a barrier coating to reduce the permeation of water into the gel coat. A temperature accelerated immersion test (65° C.) was used to assess the protective effect of various coatings on the gel coated test laminates. Tests were made on gel coated orthophthalic fiber glass laminate test panels to evaluate the effectiveness of coating materials as barrier layers to prevent or impede the development of blistering. An epoxy, a polyurethane and a polyester were used alone and in combination as coatings. Different surface treatments of the gel coat were made before coatings were applied. Following an immersion test in distilled water at 65° C., the panels were examined for blister initiation and blister severity.

The test specimens were made using the following materials: a general purpose orthophthalic marine resin for the laminate, specifically Polylite (tradename) polyester resin Type 33-072. Reichhold Chemicals, Inc.; and a white, orthophthalic resin, specifically Ferro Corporation Polyester white Gel Coat was used for the gel coat material. The fiber glass used in the laminate was 1.5 oz. fast wetout chopped strand mat.

The coating materials applied to the finished laminates were a two pot white pigmented epoxy, specifically Corlar (Dupont) Epoxy Enamel Type 823-Y-Line/VG-Y-8339; a two pot white polyurethane, specifically Imron (Dupont) Polyurethane Enamel, Type 326-Y-Line; and the identical orthophthalic acid-based polyester resin which was used for the gel coat was used for the coating. It is important to note than when the orthophthalic resin was used as a coating the outer surface cured in contact with air. Carnauba wax was used for a mold release and acetone was used for the cleaning solvent.

Laminates were made by the hand lay-up method. All samples were fabricated at 75° F. to 80° F. Gel coated laminates were prepared on a waxed glass plate. Three coats of wax were applied to a clean glass surface. The wax was dried and buffed between coats. After drying overnight, the surface of the glass was buffed and polished throughly. A doctor blade was used to draw down a 20 mil wet film gel coat. This type of applicator was used to insure uniform thickness of the gel coat. The gel coat resin was catalyzed with 1.0% MEKP catalyst. After the gel coat resin had become slightly tacky (about 15 minutes), 55 g of the orthophthalic acid-based laminating resin was poured onto the layer of gel coat. The laminating resin was catalyzed with 1.5% MEKP. All resin and catalyst were mixed thoroughly by hand. After mixing and prior to laminating, the catalyzed resin was allowed to stand for several minutes to de-air. A piece of glass mat measuring 20 cm×26 cm and weighing about 22 g was applied to the wet resin. This gave a resin/glass ratio of 2:1. The resin was allowed to bleed up through the glass mat. The glass and resin were consolidated with a serrated Teflon roller. This decreased air entrapment and insured saturation of the glass mat by the resin. Two additional layers of resin and glass mat were applied in a similar manner.

These formulations give a 15–20 minute pot life at 70° F. (21° C.). Within 24 hours, after sufficient hardening took place the laminates were removed from the glass plate. Curing took place at room temperature for a minium of 7 days.

The gel coat surfaces were then pretreated before applying the coatings. The surface of each test laminate was pre-treated using one of the following methods:

(0)=no pre-treatment,
(1)=light sanding with a 600 grit silicon carbon sandpaper,
(2)=solvent cleaning with acetone,
(3)=sanding then cleaning with acetone.

No surface treatment was used between coats.

The coating scheme used is given in Table 1 below.

TABLE 1

Coating Scheme
The sample numbers designate the type of coating applied to the gel coated polyester laminate.

| Under Coat (2 Coats) | Top Coat (2 Coats) | | |
|---|---|---|---|
| | Polyester | Polyurethane | Epoxy |
| none | (3) | (2) | (1) |
| Epoxy | | (8) | (4) |
| Polyurethane | | (5) | (7) |
| Polyester | (6) | (9) | (10) |

The second coat was always applied at 90 degrees to the previous coat with a sponge applicator brush 24 hours after the previous application. More specifically for sample (9) the undercoat was two applications, 90 degrees to one another of the polyester, the top coat was two applications of the polyurethane, 90 degrees to one another. Both coats (or all four applications) comprise the final coating.

According to the manufacturer's recommendations, the polyurethane resin, requires 7 days at 21° C. for optimum cure and for maximum chemical resistance. Therefore, after two coats of polyurethane were applied to the prepared gel coat surface, the resin was allowed to cure 7 days before the topcoat was applied. These coated laminates were cured for the typical 7 days prior to immersion. A clear epoxy resin was used to seal the back of each laminate.

All coated laminates were immersed in distilled water held at a constant temperature of 65° C.±1° C. The pH of the water was checked weekly and was found to be between pH 6.0–6.5. A systematic cooling technique was employed when removing samples from the water bath. Before the samples were weighed and examined, they were gradually cooled down by transferring them to distilled water held between 30°–40° C. for a minimum of 30 minutes. Samples were then removed from the distilled water bath and allowed to equilibrate to ambient temperatures in air. Before weighing, excess water was removed with a towel. A similar technique was used when returning samples to the 65° C. waterbath. This was done to prevent thermal shock.

There are two types of blisters which were observed in this study. One type of blister was associated with the coatings and the others was located below the gel coat. Blisters below the gel coat were differentiated from coating blisters on the following basis:

1. Diameter-to-height ratio of gel coat blisters was greater than 10:1 and approached 40:1, whereas the coating blisters had a diameter to height ratio of 2:1.
2. Gel coat blisters were irregular in shape and many times the size of coating blisters when viewed from the top.
3. The strength of the cap on a gel coat blister is greater than a coating blister and is not easily punctured.
4. The fluid in a gel coat blister is acidic (pH 3.0–4.0) while the fluid inside a coating blister is between pH 6.5–8.0.

At the end of the study when the samples were cross-sectioned, the two types of blisters were obvious. Small coating blisters were superimposed on the gel coat blisters. Microscopic examination of representative cross-sections were made. Samples were examined by stereomicroscope every two days during the first week and thereafter every week. The degree of blistering on the surface was classified according to the following scheme:

Type 0—no change in the coated laminate.
Type 1—questionable presence of coating blisters; surface may appear rough with raised, small pin point size blisters.
Type 2—numerous blisters are present.
Type 3—severe blistering over the entire laminate surface.

Examples of these two types of blisters are illustrated in FIG. 1.

The results of the immersion tests on the laminates with the various types and sequences of coatings are given in Table 2 below.

TABLE 2

COATING RESULTS

| Sample No. | Coating Scheme | Surface Treatment | Coating Blister Initiation Time (days) and Severity | Gel Coat Blisters |
|---|---|---|---|---|
| 1 | (1) | 0 None | 5 and 3 | Yes |
| 2 | Epoxy Top Coat | 1 Sand | 5 and 1 | Yes |
| 3 | | 2 Acetone | 5 and 1 | Yes |
| 4 | | 3 Both | 5 and 1 | Yes |
| 5 | (2) | 0 None | 5 and 2 | Yes |
| 6 | Polyurethane | 1 Sand | 14 and 1 | Yes |
| 7 | Top Coat | 2 acetone | ? and 1 | Yes |
| 8 | | 3 both | ? and 1 | Yes |
| 9 | (3) | 0 None | - and 0 | No |
| 10 | Polyester | 1 Sand | - and 0 | No |
| 11 | Top Coat | 2 acetone | - and 0 | No |
| 12 | | 3 both | - and 0 | No |
| 13 | (4) | 0 None | 8 and 3 | Yes |
| 14 | Epoxy top coat | 1 sand | 8 and 1 | Yes |
| 15 | Over epoxy | 2 acetone | 8 and 2–3 | Yes |
| 16 | | 3 both | 8 and 2 | Yes |
| 17 | (5) | 0 None | 7 and 1 | Yes |
| 18 | Polyurethane | 1 sand | 7 and 1 | Yes |
| 19 | Coat over | 2 acetone | 7 and 1 | Yes |
| 20 | Polyurethane | 3 both | 7 and 1 | Yes |
| 21 | (6) | 0 None | 8 and 3 | No |
| 22 | Polyester top coat | 1 sand | - and 0 | No |
| 23 | Over polyester | 2 acetone | 8 and 2 | No |
| 24 | | 3 both | 8 and 1 | No |
| 25 | (7) | 0 None | 8 and 3 | Yes |
| 26 | Epoxy top coat | 1 sand | 8 and 2 | Yes |
| 27 | Over polyurethane | 2 acetone | 17 and 1–2 | ? |
| 28 | | 3 both | 19 and 2 | Yes |
| 29 | (8) | 0 None | 11 and 3 | Yes |
| 30 | Polyurethane | 1 sand | - and 0 | Yes |
| 31 | Top coat over | 2 acetone | 11 and 1–3 | Yes |
| 32 | Epoxy | 3 both | - and 1 | Yes |
| 33 | (9) | 0 None | 6 and 3 | Yes |
| 34 | Polyurethane | 1 sand | 6 and 3 | Yes |
| 35 | Over polyester | 2 acetone | 6 and 3 | Yes |
| 36 | | 3 both | 6 and 3 | Yes |
| 37 | (10) | 0 None | 9 and 3 | Yes |
| 38 | Epoxy top | 1 sand | 9 and 3 | Yes |
| 39 | Coat over | 2 acetone | 9 and 3 | Yes |
| 40 | Polyester | 3 both | 9 and 3 | Yes |

The coatings which are applied in order to form a barrier to water permeation and reduce the rate of gel coat blister formation (epoxy and urethane) produced a variety of coating blisters.

The coatings did not prevent the formation of gel coat blisters, except in the cases where only orthophthalic coatings were applied. The time of initiation of gel coat blisters could not be determined because they were masked by the coating blisters in the early stages. On most samples, coating blisters began to form in the first week and all of the samples that showed coating blisters were blistered after three weeks. At the end of two months, the samples were removed and closer examination which included microscopy of several cross-sections revealed the gel coat blisters.

Coating blisters formed between the gel coat and the coating or between the topcoat and undercoat or in both positions. Coating blisters formed because of poor adhesion to the underlying coat which allowed buildup of a liquid with a pH of 7 to 8. On several samples, the coating delaminated forming blisters several inches long. On others, small blisters formed between the topcoat and the undercoat and larger ones formed between the gel coat and the undercoat. Some of the small topcoat blisters ruptured while immersed and small v-shaped shaped cracks were observed on the top coat. The single polyester coat did not show coating blisters and the polyester on polyester showed coating blisters only on the sample which had no surface treatment. After immersion, the polyester coats had lost their gloss and exhibited microscopic surface roughness.

In almost all cases some surface treatment was better than none at all for reducing the incidence of coating blisters. It is difficult to rank the effectiveness of the surface treatments but where a difference is noted, sanding appeared to give a more adhesive coating than acetone cleaning or the combination of acetone treatment and sanding.

As shown in Table 2 above, gel coat blisters up to 1 inch in diameter formed on 31 of the 40 samples after 2 months. Eight of the nine unblistered samples were coated with polyester. The other may have contained gel coat blisters but their presence could not be conclusively established.

At the end of the study, which ran for 2 months, the eight polyester samples were free of blisters. These samples were returned to the test chamber, and at the end of 10 months, 7 were unblistered and a single blister one inch in diamenter.

All of the gel coat blisters contained a viscous liquid with pH of 3–4. All of these blisters were located in the laminating resin under but within 0.5 mm of the gel coat.

The unexpected result was the absence of gel coat blisters on the polyester coated laminates. The gel coated samples without coatings blistered in six weeks. Urethane and epoxy coatings did not stop the blistering and if they slowed the process down, the delay was not perceptible.

The coatings can be ranked for permeability as follows: the polyester is most permeable, the polyurethane is intermediate and the epoxy is least permeable [Data Tables, Modern Plastics Encyclopedia, Vol. 61, No. 10A, McGraw-Hill (1985).] Furthermore, the polyester coating surfaces which were cured in air would have a higher permeability than polyester cured against a mold surface because oxygen from the air cause the cure-inhibition effect [Boenig, H. V., "Unsturated Polyesters: Structure and Projects" Elsevier, (1969)]. Indeed, the removal of the gloss from the polyester by immersion suggests that some material removal (etching) took place at the polyester surface.

An apparent important requirement for the blistering mechanism is a semi-permeable membrane. By this is meant a membrane which will allow water to flow in one direction but will not allow another soluble species to flow in the opposite direction. This is a prerequisite for the development of osmotic pressure. To form a blister, water diffuses into the laminate. If it does not react with water-soluble constituents in the laminate to form a solution within the laminate, it moves slowly through the polymer, is released as vapor at the back surface, establishes a steady state gradient and therefore, is not harmful.

However, if some hydrophilic, low molecular weight species (such as glycol, phthalic acid, hydroquinone, cobalt salts, or other constituents of the laminate) are concentrated at a point in the composite, a concentrated aqueous solution will form as a result of water diffusion. Osmotic pressure will build to neutralize the flow of pure solvent across the membrane. As water is drawn into the chemical solution to lower the concentration, deformation of the overlying gel coat results and this is referred to as a gel coat blister. Blisters can form only if there are concentrated pockets of low molecular weight species (osmotic center). These can be present in cases where poor mixing prevented dispersion of resin constituents, in regions of uncatalyzed material or if a mechanism exists which can concentrate the low molecular weight material during immersion in water.

Blistering cannot take place if the surface membrane is permeable (as opposed to semipermeable). If low molecular weight molecules or ions can be leached out of the polymer as water moves in, osmotic pressure cannot build and blistering will not take place.

It appears that the protective effect of the polyester coatings is due to the formation of a permeable surface which allows back diffusion (or leaching, i.e. water aided transport) of low molecular weight species. Gel coat surfaces which are set against molds form a semipermeable surface, i.e. water can enter but low molecular weight water solubles cannot leave. We believe that when the orthophthalic acid-based polyester is painted on the gel coat, the styrene in the coating dissolves the surface layer of the gel coat as the surface coating crosslinks in air, an air-inhibited, high permeability layer is formed. An added polyester coating simply adds one more film thickness of high permeability material and alters the permeability of the underlying gel coat.

In the cases where polyester is the undercoat and epoxy or polyurethane is the top coat the following takes place. The polyester coating again destroys the impermeability surface of the gel coat which would enable the removal of low molecular weight materials. However, the surface is then coated with epoxy or polyurethane which serves as semipermeable coating on the laminate and leaching is again prevented, blisters form.

Quarter-inch thick, 3 inch disks of neat orthophthalic acid-based polyester resin, specifically a cobalt salt promoted general purpose marine polyester resin, Polylite, Type 33-072; were cured with one side against the glass mold and the other exposed to air. After hardening, the samples were removed from the glass and immersed in water at 65° C. After several weeks of immersion in distilled water at 65° C., blisters were found on the side which had been set against the glass but none were formed on the air-cured side. One additional observation which is explained by the permeable surface theory is the frequent observation that the back surface (no gel coat) of the laminate does not blister.

Finally, observations on coating blisters show that these blisters are also osmotic in nature. Since the coating films are very thin, very low osmotic pressures are needed to cause the blisters, especially if poor adhesion is present. The soluble species which are responsible for forming the solutions at the coating interfaces are known to be alkaline since the solutions increased in pH above the value of the diffusing water.

The invention has been described in reference to applying a permeable coating to an existing fiberglass reinforced polymer having an existing gel coat thereon such as is used for boat hulls. It is within the scope of this invention that gel coats per se having the desired permeability characteristics, together with the other physical and chemical characteristics for which such gel coats are originally intended, may be applied directly to the fiber reinforced plastic. That is, the invention contemplates a coating which prevents blistering on state of the art gel coated fiber reinforced plastic and to a gel coating per se which when applied to fiber reinforced plastics will not blister.

Examples of other fiber reinforced polymers for which the permeability of the gel coat is important are swimming pools, spas (i.e. hot tubs), storage tanks, pressure pipes (filament round glass single-end roving), sanitary ware, sandwich panel construction, synthetic marble, furniture, chemical processing equipment etc.

The invention further has been described in reference to a specific prior art fiber reinforced polymer and polymer gel coat. Other polymers which may be used are isophthalic polyesters, orthophthalic polyesters, terphthalic polyesters, vinyl polyesters, epoxides, acrylics, polyurethanes, isocyantes, formaldehyde-based polymers, silicones, flourocarbon based resins and combinations thereof.

Fibers in addition to glass fibers which may be used include carbon fiber, organic fiber, whiskers, fibers from silicon dioxide, Kevlar, graphite fibers, ceramic fibers or combinations thereof.

Polymers other than the specific polyester described herein for the permeable coating which are within the scope of the invention include any polymeric coating material which has a diffusion coefficient such that blister causing molecular weight species may pass through the gel coat without blistering the gel coat. Specifically resins either of the thermometting or thermoplastic type which are believed to be suitable include formaldehyde-based polymers such as urea-formaldehyde, melamine-formaldehyde, alkyds, polyesters, epoxies, chlorinated rubbers; cellulosic compounds, ethylene polymers, polyolefins, polyurethanes, silicones, vinyls, (including vinyl strynes) acrylics, polyamides, polycarbonates, and combinations thereof.

Preferably, when preparing gel coated fiber reinforced polymers for preparation of application of the permeable coating, the outer layer of the gel coating should be removed such as by sanding, solvents, sand blasting, etc.

Having described our invention, what we now claim is:

1. A method for preventing blistering of a gel coated fiber reinforced polymer which is characterized by the presence of osmotic centers, which comprises
   coating the fiber reinforced polymer with a permeable gel coat, the gel coat selected from the group consisting of formaldehyde-based polymers such as urea-formaldehyde, melamine-formaldehyde, alkyds, polyesters, epoxies, chlorinated rubbers; cellulosic compounds, ethylene polymers, polyolefins, polyurethanes, silicones, vinyls, (including vinyl styrenes) acrylics, polyamides, polycarbonates, and combinations thereof and having a permeability which will allow the osmotically active molecules to diffuse from the osmotic centers through the gel coat at a defined transport rate whereby blistering of the gel goat is prevented.

2. The method of claim 1 which includes air curing the gel coat.

3. The method of claim 1 which includes air-inhibiting the cure of the gel coat.

4. The method of claim 1 wherein the fiber reinforced polymer includes a semipermeable gel coat thereon which gel coat is subjected to blistering by the inability of osmotically active molecules to diffuse from the osmotic centers through said gel coat which includes:
   applying the permeable gel coat to said semipermeable gel coat whereby the semi-permeable properties of said gel coat are affected such that the osmotically active molecules can diffuse through said gel coat and the permeable coat whereby blistering is prevented.

5. The semipermeable method of claim 4 which includes
   treating the gel coat prior to the application of the permeable coat.

6. The method of claim 5 which includes
   treating said gel coat by abrasion.

7. The method of claim 5 which includes
   treating said gel coat by solvent cleaning.

8. The method of claim 4 wherein the gel coat is selected from the group consisting of isophthalic polyesters, orthophthalic polyesters, terphthalic polyesters, vinyl polyesters, epoxides, acrylics, polyurethanes, isocyanates, formaldehyde-based polymers, silicones, flourocarbon based resins and combinations thereof.

9. The method of claims 1 or 4 wherein the permeable coating is an orthophthalic polyester.

10. The method of claim 1 wherein the fibers are selected from the group consisting of carbon fiber, organic fiber, whiskers, fibers from silicon dioxide, Kevlar, graphite fibers, ceramic fibers or combinations thereof.

11. The method of claim 1 wherein the reinforced polymer is selected from the group consisting of isophthalic polyesters, orthophthalic polyesters, terphthalic polyesters, vinyl polyesters, epoxides, acrylics, polyurethanes, isocyantes, formaldehyde-based polymers, silicones, flourocarbon based resins and combinations thereof.

12. A composition for coating fiber reinforced polymer which polymer are characterized by osmotic centers which comprises:
   a permeable gel coat selected from the group consisting of formaldehyde-based polymers such as urea-formaldehyde, melamine-formaldehyde, alkyds, polyesters, epoxies, chlorinated rubbers; cellulosic compounds, ethylene polymers, polyolefins, polyurethanes, silicones, vinyls, (including vinyl styrenes) acrylics, polyamides, polycarbonates, and combinations thereof having a permeability which will allow the osmotic reactive molecules to diffuse from the osmotic centers through the gel coat at a defined diffusion rate whereby blistering of the gel coat is inhibited.

13. The composition of claim 12 wherein the coating is an orthophthalic polyester.

* * * * *